Patented Mar. 29, 1932

1,851,165

UNITED STATES PATENT OFFICE

STEWART M. FARR, OF DETROIT, MICHIGAN

LACTOBACILLUS ACIDOPHILUS MILK PRODUCT AND ITS METHOD OF MANUFACTURE

No Drawing.  Application filed May 16, 1927. Serial No. 191,932.

My invention relates to an improved lactobacillus acidophilus concentrated milk product, to an improved process of its manufacture, and to an improved method of concentrating acidophilus bacilli in milk.

An object of my invention is to provide a palatable, readily ingestible product containing lactobacillus acidophilus in far greater number than are contained in the same quantity by weight or cubic contents of acidophilus milk. Per unit of measurement my improved product contains many times more bacteria than are contained in acidophilus milk and the product is of such a character that the viability of the organisms is retained for a substantial period of time.

In the present state of the art, acidophilus milk is widely used for therapeutic purposes and a quart of such milk is commonly employed as a single dose. Due to the dislike which some persons have for milk in any form, this type of a carrier is unsuited for such persons. Moreover, it is a carrier of an inconvenient form and is not easily stored or transported particularly by the one who makes use of it. It should be delivered daily from the producer to the user, which materially reduces the prospects of a wide commercial distribution. My improved product is of such a form as to completely avoid these objections.

My improved process is adapted to be employed to concentrate the acidophilus organisms in milk to a far greater degree than has heretofore been possible. To such an extent it is a step in advance over the prior art and, in addition, I provide for the separation and removal of the lactobacillus concentrate from the milk and its utilization in my improved product.

Acidophilus milk constitutes the starting point of my invention. This product is commercially known. It is described, together with the method of its manufacture, in United States Patent No. 1,506,501, to Rettger et al.

Briefly stated, in the commercial production of acidophilus milk as now practiced, it is customary to inoculate litmus milk with the lactobacillus acidophilus cultures which are permitted to incubate therein at a temperature of 98° F. for twenty-four hours, which product then forms what is known as the primary culture. The primary culture is employed in the inoculation of sweet, sterile, skim milk, which is likewise incubated and is made daily and which forms the secondary culture.

The secondary culture is employed to inoculate sweet, sterile, skim milk which, after a similar incubation, forms the tertiary culture from which the commercial product is obtained by heating sweet, skim milk under pressure to a temperature of 230° F.; retaining the milk at such temperature for fifteen or twenty minutes; allowing the milk to cool to 100° F. and inoculating the milk with the tertiary culture at such last named temperature to an extent of one per cent of the total quantity of milk required and the inoculated quantity of milk is agitated for a few minutes and then allowed to incubate for some eighteen hours or until the milk reaches an acidity of between seven and eight tenths per cent, at which point the acidity developed inhibits the further propagation of the bacteria. The product so obtained is the acidophilus milk of commerce and is the material with which I commence.

By my process I produce an acidophilus milk product wherein the acidophilus bacilli are propagated in far larger numbers per unit of milk than is the case in this acidophilus milk of commerce. In the working out of my improved process, when the acidophilus milk reaches an acidity, due to the development of the organism therein, of seven to eight tenths per cent as above described, I add thereto a sterile, alkaline solution in sufficient quantity to reduce the acidity to between one to three tenths per cent in terms of lactic acid.

The milk is then allowed to incubate further until the acidity again reaches seven to eight tenths per cent. The acidity is again reduced by the addition of an alkaline solution to from one to three tenths per cent. The milk is then again allowed to incubate and then again reduced, and this incubation and reduction of acidity may be successively repeated for such a number of times as is necessary to produce the maximum concentration of the organisms which is desired.

With the last addition of alkaline solution, a small quantity of rennet is added to the milk and the milk is allowed to stand until a slight precipitation of casein occurs. When the proper precipitation of casein occurs, the milk is run into a centrifuge which is operated at a speed and for a length of time necessary to concentrate the bacterial content of the milk into the separated curd. This bacteria impregnated curd is removed from the centrifugal machine and to increase its palatability other food products such as butter, salt, sugar, or honey, may be added thereto and mixed therewith in a suitable mixing machine until the concentrate acquires a paste-like consistency. The concentrate thus prepared is formed or molded into tablets and these tablets are covered with a substantially air-impervious, palatable, ingestible coating, such as chocolate. The product in this form is capable of being readily stored and transported and is adapted to retain the viability of the bacteria with which it is impregnated. These tablets may be formed in size approximating that of chocolate drops as usually sold by the confectioner and four or five of such tablets contain lactobacillus acidophilus in number substantially equal in therapeutic effect to a quart of the commercial acidophilus milk. It is probable that the above treatment of acidophilus milk renders it less digestible and therefore gives the organism greater protection from the digestive juices. It can be demonstrated that implantation of lactobacillus acidophilus in the colon can be effected more quickly by the use of the concentrated improved product than by the use of acidophilus milk.

What I claim is:

1. That process of producing an acidophilus milk product which consists of inoculating sterilized skim milk with an acidophilus culture, allowing the milk to incubate, reducing the acidity of the milk by the addition of an alkaline solution thereto and repeating the incubation and reduction of acidity until the desired concentration of acidophilus organism is obtained, adding rennet to the milk and allowing it to stand until a slight precipitation of casein occurs, and centrifuging the milk at an acidity of not to exceed 0.8% until the acidophilus organisms are concentrated within the impregnated curd, removing the curd, molding the same into tablets and covering the tablets with a substantially air-impervious, ingestible coating.

2. The method of producing an acidophilus milk product which consists in inoculating sterilized skim milk with a culture of B. acidophilus, allowing the milk to incubate, reducing the acidity of the milk by the addition of an alkaline solution thereto and repeating the incubation and reduction of acidity until a curd and the desired concentration of bacillus acidophilus is obtained, then removing substantially the greater number of such organisms with the curd and retaining them therein as living B. acidophilus.

3. As a new milk product, curd obtained from bacillus acidophilus milk prepared by incubation from sterilized skim milk from which the curd is taken together with living bacillus acidophilus in number many times greater per volume of curd as compared to the original milk, said curd being enclosed in an outer ingestible substantially air-impervious shell and constituting substantially the whole mass within said shell.

4. As a new medicinal milk product, curd obtained from bacilli acidophilus milk containing bacillus acidophilus incubated in pure skim milk which has previously been sterilized and cooled to substantially body temperature and from which the curd is taken as the finished product, said curd containing living B. acidophilus in number many times greater per volume of curd as compared to the original, sterilized milk.

In testimony whereof, I, STEWART M. FARR, sign this application.

STEWART M. FARR.